United States Patent
Stann

(10) Patent No.: US 6,618,125 B2
(45) Date of Patent: Sep. 9, 2003

(54) CODE-MULTIPLEXED READ-OUT FOR LADAR SYSTEMS

(75) Inventor: Barry L. Stann, Edgewater, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/988,411

(22) Filed: Sep. 5, 2001

(65) Prior Publication Data

US 2002/0048012 A1 Apr. 25, 2002

Related U.S. Application Data

(60) Provisional application No. 60/229,996, filed on Sep. 5, 2000.

(51) Int. Cl.[7] .................... G01C 3/08; G01B 11/26; H04N 5/335; H04N 3/12
(52) U.S. Cl. ................. 356/5.09; 356/141.1; 348/302; 348/332
(58) Field of Search .................. 356/4.01, 152.3; 348/302–324, 332

(56) References Cited

U.S. PATENT DOCUMENTS

| | | | |
|---|---|---|---|
| 5,005,085 A | * | 4/1991 | Spies et al. |
| 5,200,793 A | * | 4/1993 | Ulich et al. |
| 5,877,851 A | * | 3/1999 | Stann et al. ............. 356/5.09 |
| 5,892,575 A | * | 4/1999 | Marino ................... 356/5.01 |

* cited by examiner

Primary Examiner—Stephen C. Buczinski
(74) Attorney, Agent, or Firm—Paul S Clohan, Jr.; William W. Randolph

(57) ABSTRACT

A method and apparatus of a plurality of detecting elements for detecting and producing an image of an object includes a signal generator for generating a waveform signal, a laser for producing a light signal modulated by the waveform signal, and a mixing and detecting device coupled to and driven by the signal generator for converting reflected light signals received from the target into electrical signals and for mixing the converted electrical signals with the waveform signal to produce an output electrical signal. A read-out is connected to the mixing and detecting device for removing the output electrical signals from the mixing and detecting, and a signal processor is connected to the read-out for processing the output electrical signals from the read-out to detect and produce and image of the object.

22 Claims, 10 Drawing Sheets

CODE-MULTIPLEXED READ-OUT FOR LADAR SYSTEMS

This application claims the benefit of U.S. Provisional Application Ser. No. 60/22996 filed Sep. 5, 2000, entitled Code-Multiplexed Read-Out For Focal Plane Arrays, and herein incorporated by reference in its entirety.

GOVERNMENT INTEREST

The invention described herein may be manufactured, licensed, and used by or for the U.S. Government

BACKGROUND OF THE INVENTION

1. Field of the Invention

This invention generally relates to laser detection and ranging (ladar) systems; and more particularly, to an incoherent ladar which utilizes code division multiplexing for capturing image data on focal plane detector arrays.

2. Description of the Prior Art

Use of ladar technologies to form images of targets is set forth in U.S. Pat. Nos. 5,608,514, 5,877,851 and a U.S. Provisional Application filed Jun. 29, 2001 entitled "A Ladar System For Detecting Objects" assigned to the same entity, and herein incorporated by reference.

Ladar is basically radar transformed from a system for measuring reflected radio frequency electromagnetic radiation, typically in the 1–25 cm wavelength range to locate remote objects, to a system that operates on laser radiation, typically in the 0.1 to 10.0 $\mu$m range. The resulting combination of radar principles and optics provides a system with inherently enhanced accuracy in the measurement of range, velocity, and angular displacement. Moreover, the high carrier frequency allows ladar systems to be made compact in physical dimension, which is particularly attractive in aircraft, projectile, space and other volume-limited applications.

U.S. Pat. No. 5,608,514, (the '514 patent) issued Mar. 4, 1997 describes a technique for achieving high range resolution for a single pixel ladar by employing frequency modulation (FM) radar ranging principles.

Three-dimensional imaging of a scene is achieved by mechanically scanning the single pixel ladar or by building arrays of such ladars. To perform ranging on a single pixel, the ladar's laser transmitter is amplitude modulated with a radio-frequency subcarrier which itself is linearly frequency modulated. The target-reflected light is incoherently detected with a photodiode and converted into a voltage waveform.

The voltage waveform is then mixed with an undelayed sample of the original laser amplitude modulated waveform. The output of the mixer is processed to remove "self clutter" that is commonly generated in FM ranging systems and obscures the true target signals. The clutter-free mixer output is then Fourier transformed to recover target range.

The '514 patent uses a mechanical scanner to scan the laser output beam and the receiver or detected field of view to form an electronic image of the target. The development of a scannerless ladar generally requires a receiver, which incorporates focal plane array (FPA) technology, such as found in imaging cameras.

As a consequence, another receiver design was conceived and disclosed in U.S. Pat. No. 5,877,851 (the '851 patent) where an electro-optic (EO) light modulator, positioned in the receiver light path, performs demodulation optically and a standard focal plane array performs detection of the demodulated light. Thus, while the laser transmitter is modulated as in the '514 patent, the entire scene or field of view is illuminated.

The method and apparatus of the '851 patent may be applied to both one-dimensional and two-dimensional detector arrays having any number of detectors. Numerous image frames are recorded periodically over the frequency modulation (FM) period. A Fourier transform taken over time for a pixel establishes the range to the target in that pixel. Performing the Fourier transform for all pixels yields a three-dimensional image of objects in the field of view. Using a laser illuminator, a focal plane detector array, electro-optical light modulator, and microwave circuit elements in conjunction with FM-CW radar ranging theory yields a scannerless ladar possessing high range resolution without range ambiguities.

While the ladar system of the '851 patent is scannerless, there are limitations. As an example, the ladar approach of the '851 patent requires a high speed electro-optic modulator such as a quantum-well device (QWEO) commensurate in size with the ladar focal plane array (FPA). For a QWEO modulator that matches the size of a typical focal plane array (4×4 mm), the capacitive load presented by such a device is in the low 1000's of picofarads which is difficult to drive using microwave amplifiers. Another limitation with this approach is that the bandgap of the QWEO modulator and the laser line should remain coincident over temperature variations which adds to system complexity.

With the provisional application, the demodulation and detection functions of the EO light modulator and the FPA, respectively are combined in a FPA comprised of "self-mixing" detectors. Image frames from the focal plane arrays of "self-mixing" detectors are processed analogously to the '851' patent. In both the '851' patent and the provisional patent, the frame-rates required by the ladar system for a variety of applications will often exceed the ability of existing techniques to read data out of the FPA's.

SUMMARY OF THE INVENTION

A ladar system and method for detecting a target, comprises a signal generator for generating a waveform signal, a laser for producing a waveform modulated light signal, a mixing and detecting means coupled to and driven by the signal generator for converting reflected light signals received from the target to electrical signals and for mixing the converted electrical signals with the waveform signal to produce an output electrical signal containing information for detecting the target. The ladar system also comprises a read-out means connected to the mixing and detecting means for removing the output electrical signals from the mixing and detecting means and a signal processor connected to the read-out means for processing the output electrical signals to detect and determine the range to the target. The mixing and detecting means comprises a plurality of detecting elements wherein each detecting element detects and converts reflected light signals received from the target to electrical signals and the read-out means comprises a code generator for generating a different code signal for each of the detecting elements and for combining the code signal for a each detecting element with the output electrical signal produced by the respective detecting element during the waveform period to produce combined output signals for each of the detecting elements. The read-out means further comprises a summing means for summing the combined output signal for each detecting element in a pre-selected group of the detecting elements to produce a summed group output signal. The read-out means further comprises a de-multiplex means for separating the output electrical signal of a detecting element in a the group from the summed group output signal by multiplying the code signal for the detecting element by the summed group output signal to generate a product that contains the output electrical signal of the detecting element and an integrating means for recovering the output electrical signal.

The invention also comprises a method and apparatus for processing light signals received from an object by a focal plane array having a plurality of detecting elements, wherein each detecting element detects and converts a reflected light signal received from the object to an electrical signal, and a read-out circuit connected to the focal plane array for extracting the converted electrical signals from each of the plurality of detecting elements in the array and for combining the extracted signals to form an image of the object.

The above brief description sets forth rather broadly the more important features of the present invention in order that the detailed description thereof that follows may be better understood, and in order that the present contribution to the art may be better appreciated. There are, of course, additional features of the invention that will be described and which will form the subject matter of the claims appended hereto.

Accordingly, one object of the present invention to provide a ladar system of efficient design that is capable of being used for high speed requirements.

Another object of the present invention is to provide a method and apparatus which can be readily adapted to ladar systems and which is capable of high range resolution and target detection.

It is another object of the present invention to provide a method and apparatus of reliable design that can be efficiently utilized with focal plane arrays for forming images of objects.

A further object of the present invention is to provide a method and apparatus that incorporates focal plane array and self-mixing detector technologies to form three dimensional images of objects.

Another object of the present invention is use a code de-multiplexing signal processing to achieve unambiguous high range resolution and image formation of objects and targets.

The above and still further objects, features and advantages of the present invention will become apparent upon considering the following detailed description of the invention and specific embodiments thereof, particularly when viewed in conjunction with the accompanying drawings wherein like reference numerals in the various figures are utilized to designate like components.

BRIEF DESCRIPTION OF THE DRAWINGS

Other objects and advantages of the invention will become apparent upon reading the following detailed description with reference to the attached drawings, wherein.

DETAILED DESCRIPTION OF THE INVENTION

Figure 1:
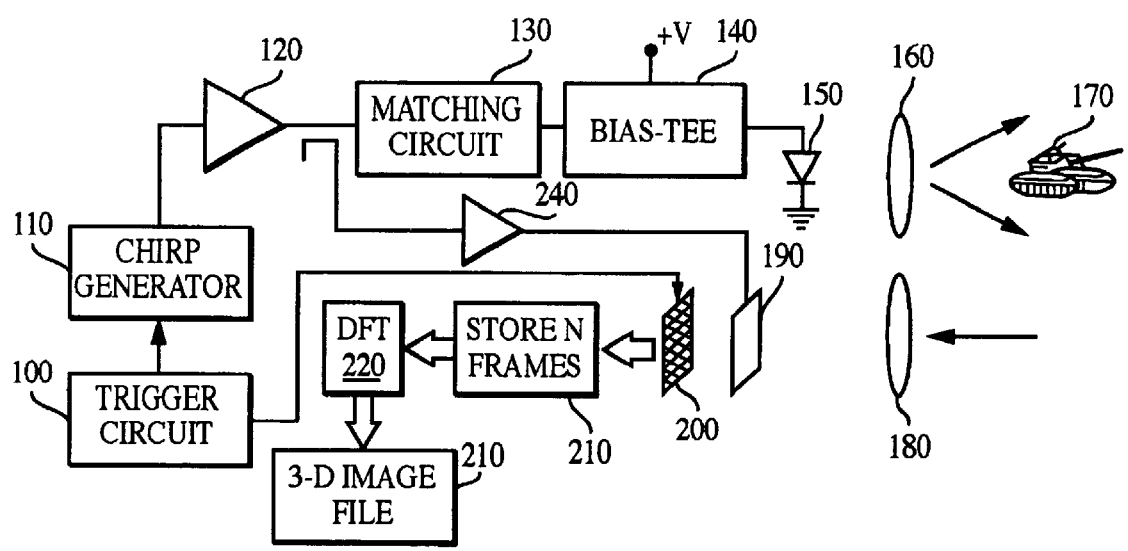
FIG. 1 is an electronic block diagram of a ladar architecture.

Referring now to FIG. 1, there is shown an electronic block diagram of the ladar architecture disclosed in U.S. Pat. No. 5,877,851. This ladar system captures high angular resolution and high range resolution images of target scenes without the need for mechanical scanning of the ladar's laser or receiver beams, as necessitated with the ladar system of U.S. Pat. No. 5,608,514. This was accomplished with focal plane detector arrays, frequency modulation (FM) radar ranging principles, and electro-optic light modulators (a class of devices including gain-modulated image intensifiers, and quantum-well electro-optic light modulators). In FIG. 1, trigger circuit 100 initiates generation of a sawtooth chirp signal 115 that serves as the laser modulation and local oscillator signal. The chirp signal will persist for some period, T. A chirp signal is simply a sinusoidal waveform whose frequency linearly increases over T. Other modulation waveforms may also be used.

In FIG. 1, the chirp signal is fed into a wideband RF power amplifier 120 which modulates the current driving semiconductor laser diode 150. Wideband matching circuit 130 between wideband RF power amplifier 120 and semiconductor laser diode 150 matches the driving impedance of wideband RF power amplifier to semiconductor laser diode 150 over the modulation bandwidth. Matching the driving impedance of the amplifier causes the light beam intensity to be highly amplitude modulated (AM) and causes the peak intensity to be constant as a function of chirp frequency. Output from wideband matching circuit 130 and a DC current (+V) are summed in bias tee 140 to provide the current drive for semiconductor laser diode 150 with a bandwidth at least equal to the chirp waveform.

The divergent laser beam from semiconductor laser 150 is collected by a lens 160, which collimates the light in a beam sufficiently wide to encompass or floodlight the target scene of interest 170. A small portion of the laser light is reflected from target 170 back toward the ladar and collected by lens 180. Electro-optic light modulator 190 is driven by the original laser modulation waveform by tapping off a portion of the output of wideband RF power amplifier 120 and amplifying the signal through amplifier 240. Electro-optic light modulator 190 is located in the light path somewhere between lens 180 and focal plane detector array 200.

Electro-optic modulator 190 modulates (mixes) the received light from the target with the original chirp signal and the mixed light signal is then focused onto focal plane detector array 200. Each photo-detector element in focal plane detector array 200 converts incident light power into an electric charge proportional to the integral of the light power taken over the sampling time of the array. Thus, modulator 190 multiplies the optical signal from the target with the chirp waveform and passes the modulated optical signal to an optical detection array where it is converted into an electrical signal.

Amplifiers within focal plane detector array 200 convert the electric charge to produce a voltage proportional to the light energy. This voltage represents a sample of the intermediate frequency (IF) waveform normally recovered in frequency modulation (FM) radar systems. To collect a full IF waveform, the focal plane detector array and the integrated read-out circuit 200 collect data periodically along the chirp period and sends it to memory 210. The data set in memory 210 contains, for each pixel, an intermediate frequency (IF) waveform which includes all of the magnitude, range, and phase information derived from the light reflected from scatterers in that pixel.

Figure 2:
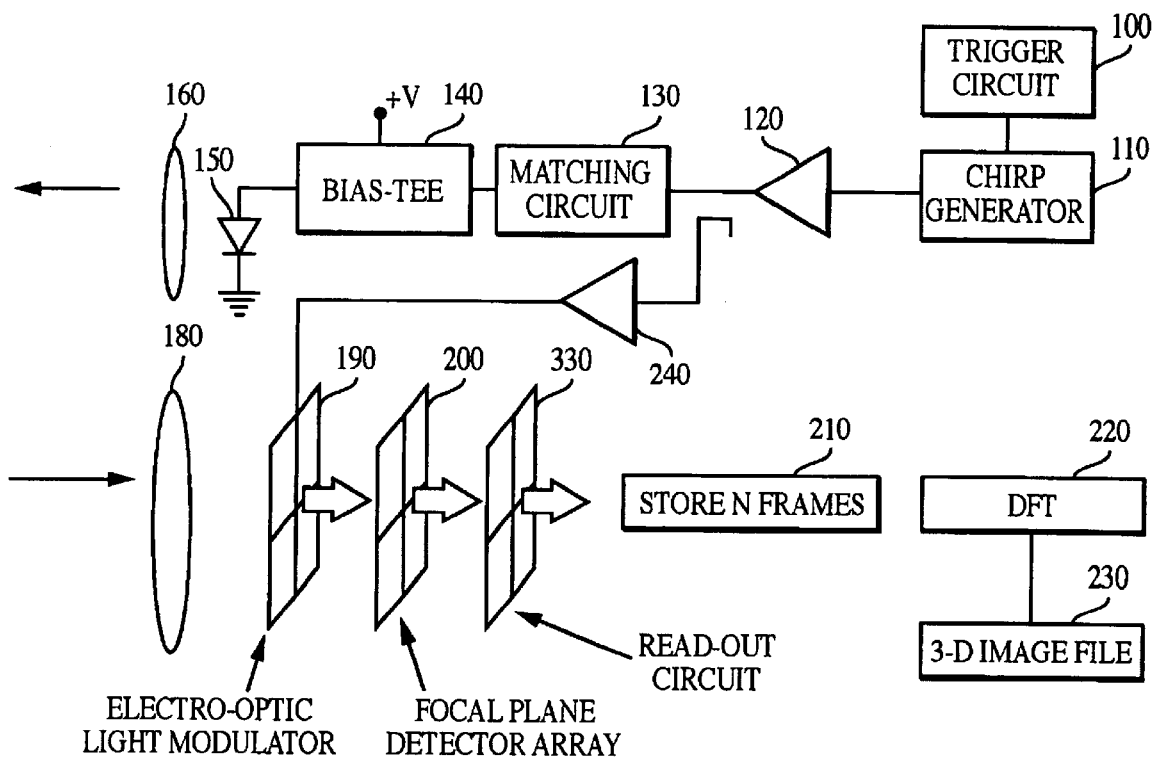
FIG. 2 is a diagram of the ladar architecture of FIG. 1, with a readout circuit.

After the chirp period (T), the three-dimensional data set in memory 210 is passed to a signal processor 220 which forms range cells by performing the discrete Fourier transform (DFT) 220 on the time signal resident in each pixel. The transformed data set is a three-dimensional image file 230 of the original illuminated scene. FIG. 2 shows the addition of a readout circuit 330 to the structure of FIG. 1.

Figure 3:
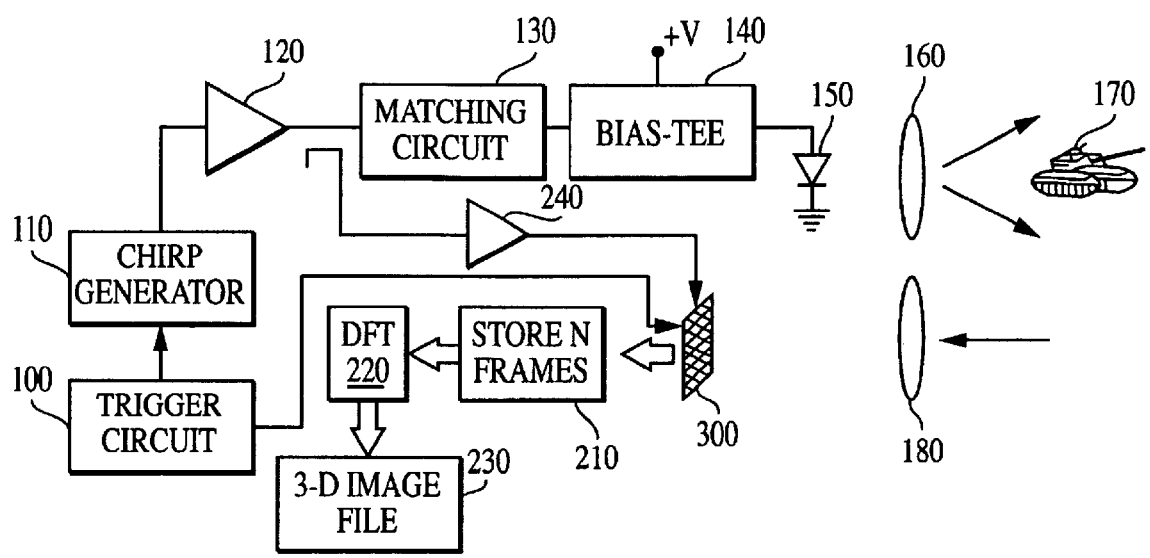
FIG. 3 is an electronic block diagram of another ladar architecture.
Figure 4:
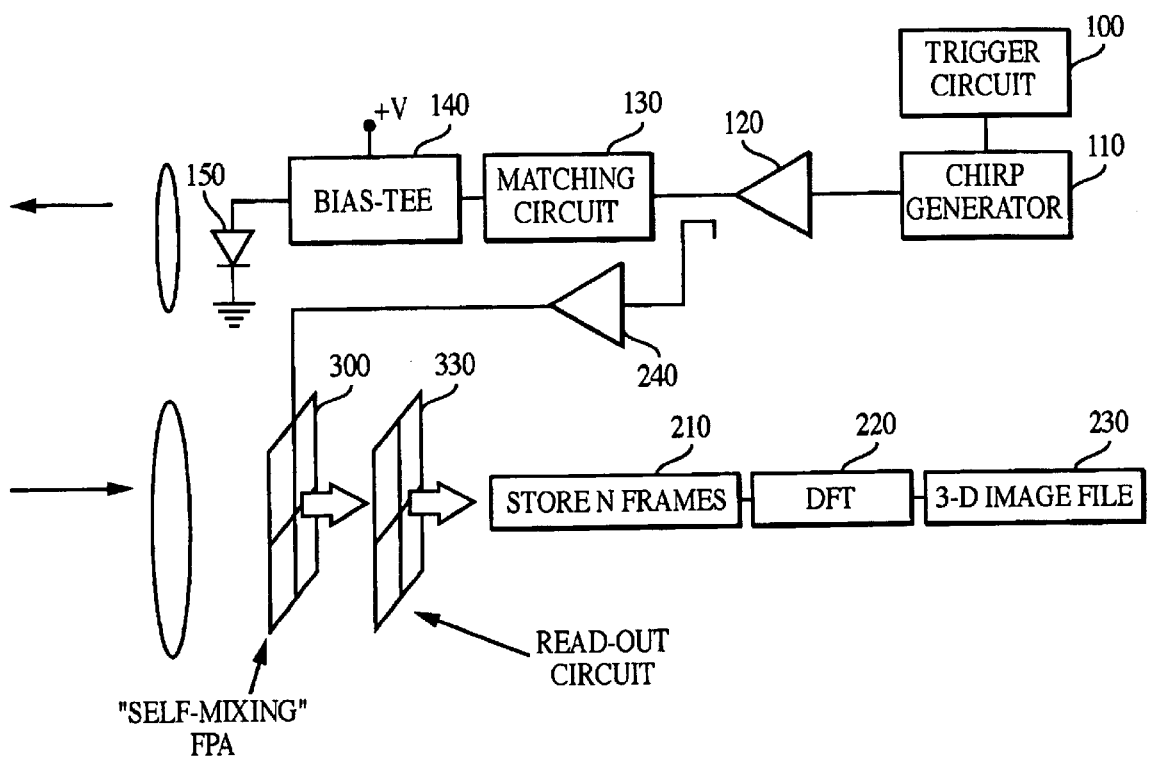
FIG. 4 is a circuit diagram of the ladar architecture of FIG. 3, with readout circuit.

Referring now to FIGS. 3 and 4, there is generally disclosed another ladar system which utilizes self-mixing detectors, such as metal-semiconductor-metal (MSM) detectors. FIG. 3 is a basic electronic block diagram of the ladar system and FIG. 4 shows a separate read-out circuit 330. In FIG. 3, the laser function comprises amplifier 120, matching circuit 130, bias tee 140, and laser diode 150. In FIG. 3, a single unitary device, a self-mixing detector array 300 performs the signal mixing and read-out functions. Referring to FIGS. 3 and 4, a trigger circuit 100 initiates the generation of a sawtooth chirp signal 115 that serves as the laser modulation and local oscillator signal.

Figure 5:
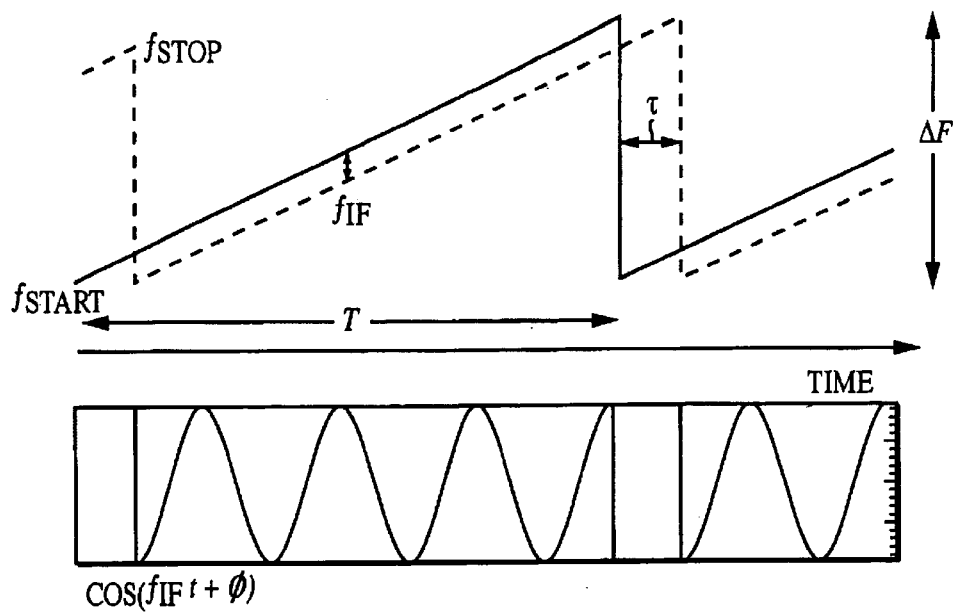
FIG. 5 is a diagram depicting one example of a FM/cw ranging waveform for the ladar architecture used with the present invention

This chirp signal 115 is simply a sinusoidal waveform whose frequency linearly increases over a period, as shown in the top portion of FIG. 5. The chirp signal 115, for example, may have a start frequency in the tens to low hundreds of megahertz and a stop frequency in the hundreds of megahertz to low gigahertz. Other modulation waveforms, such as triangle waves (i.e., contiguous rising and declining chirps), short pulses, and psuedo-random code modulations, are usable with appropriate variations to the ladar signal-processing structures of FIGS. 1 through 4. To simplify discussion of the ladar architecture, we use only the sawtooth modulation format, which yields high range resolution with a minimum amount of ladar complexity To modulate the laser illumination, the chirp signal 115 is fed into a wideband rf power amplifier 120 with a low output driving impedance. Output from the amplifier 120 and the DC current are summed in a bias tee 140 to provide a modulated current drive for a semiconductor diode laser 150 with a bandwidth at least equal to the bandwidth of the chirp waveform. A high-percentage amplitude modulation of the light beam is desirable. The divergent laser beam from the semiconductor laser is collected and focused with lens 160 to project a beam sufficiently wide to encompass or floodlight the target scene 170 of interest.

In FIGS. 3 and 4, a small portion of the transmitted beam is reflected from the target 170 back toward the ladar and collected by the receiver optics 180. A self-mixing detector array 300, such as a metal semiconductor metal (MSM) detector, is located at the focal plane of the receiver optics 180. When the transmitter modulation waveform (local oscillator (LO)) is applied to the self-mixing detectors 300, a photo-current response is recovered at each detector in the array that is the product of mixing the local oscillator (LO) waveform and the modulated light waveforms. For a sawtooth modulation of the present invention, the instantaneous transmitted and received chirp waveforms differ in frequency (by $f_{if}$) because of the chirp and the round-trip light propagation time ($\tau$). Mixing in the self-mixing detector arrays produces a sinusoidal photo-current at $f_{if}$ (IF waveform), as shown in the lower portion of FIG. 5, that can be sampled by read-out circuits.

The intermediate frequency (IF) waveforms from each self-mixing detector in the array 300 are then fed into a read-out circuit. The read-out circuit, as indicated in FIGS. 3 and 4 and which is included in the self-mixing detector assembly 300, converts the currents into voltages, samples the voltages, and transfers the voltage data out of the read-out and into a memory 210. This process is repeated periodically over the chirp period at a rate adequate to sample the highest expected IF. The resulting data set in memory contains, for each pixel, the intermediate frequency (IF) waveform that includes all the magnitude, range, and phase information derived from the light reflected from all targets or scatterers in that pixel.

For the ladar architectures such as shown in FIGS. 1 through 4, the IF waveform is processed for extracting range information. For FM ranging theory for sawtooth FM modulation, for example, the mean frequency $f_{if}$ of the IF waveform is given by $$f_{if}=(\Delta F/T)\tau,$$

where $\Delta F$ is the difference between the start and stop frequencies of the chirp signal. This equation follows from standard FM radar ranging theory and can be derived by a geometrical examination of the upper portion of FIG. 5. The expression for the propagation time ($\tau$) is $$\tau=2D/c,$$

where D is the distance from the sensor to the target and c is the velocity of light. Substituting this expression into the equation for $f_{if}$ yields $$f_{if}=(2\Delta F/c)(D/T)$$

which shows that the frequency of the IF waveform is directly proportional to the range to the target. From this it follows that the discrete Fourier transform performed over the IF waveform in each pixel will establish the range to all targets or scatterers in the pixel and the respective magnitude and phase of the target's signal. The intrinsic resolution of the ladar $\Delta R$ (i.e., the minimum distance between two separate targets that can be resolved) is equal to $$\Delta R=c/2\Delta F.$$

Figure 6:
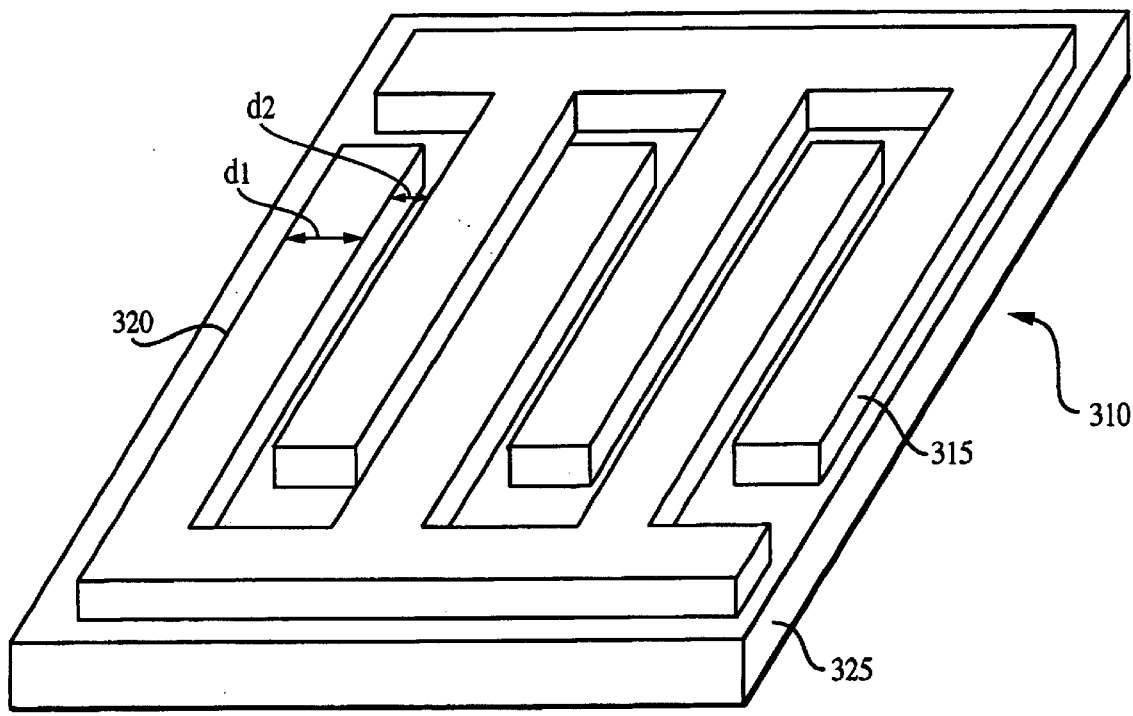
FIG. 6 is an illustration of a self-mixing detector.
Figure 7:
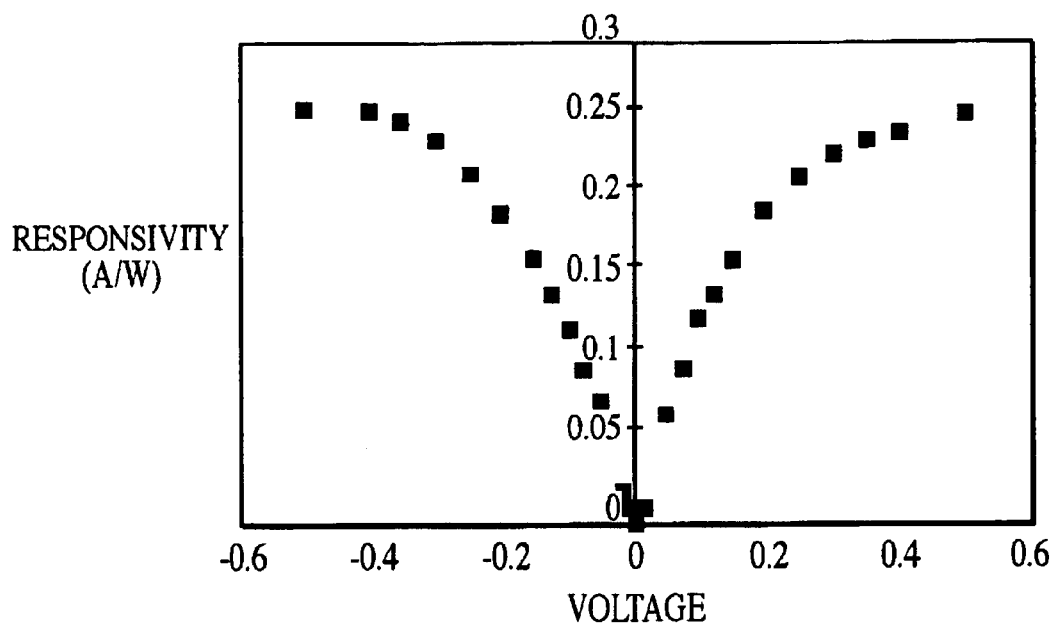
FIG. 7 is a plot of the responsivity versus voltage for a self-mixing detector/receiver of FIGS. 3 and 4.

The ladar systems of FIGS. 1 through 4 have advantages that would support different applications. For one, they illuminate the scene with semiconductor diode lasers, which are low-cost, rugged devices comparable to those mass produced for applications such as fiber optic communications, bar code scanners and CD disk players. Additionally, because the ladar employs FM/cw ranging principles, it can achieve 0.25 m or less range resolution with minimum use of microwave circuitry. While many ladar systems detect one target in a single pixel, the ladar systems are linear systems and thus can detect multiple targets in a pixel. For this reason, the ladar systems can form high quality images where targets may be surrounded by thin foliage An example of a "self-mixing" detector design is a metal-semiconductor-metal (MSM) detector 310, as shown in FIG. 6. The metal-semiconductor-metal detector comprises a series of inter-digitated metalized electrodes 315, 320 deposited on an undoped semiconductor substrate 340. The preferred detector is essentially an n++-i-n++ type device with the metal chosen such that the metal-to-semiconductor interface forms a Schottky barrier diode. The device exhibits a voltage variable responsivity, as shown in FIG. 7, which can be modulated at RF frequencies to achieve mixing of the modulated light and the applied LO voltage to generate the $f_{if}$ equation discussed above. The MSM detector designs generally operate at a wavelength of 0.8 μm and are built on undoped GaAs substrate. MSM detector designs at other wavelengths may use other material systems and rely on epitaxially-grown material in place of the undoped substrate. Nonetheless, the desired operating modes, parameters and characteristics of detectors at other wavelengths should be similar to the 0.8 μm designs to attain good ladar performance. For simplicity, the following text only discusses the performance of the 0.8 μm detector to establish the ground rules for a good detector design.

Figure 8:
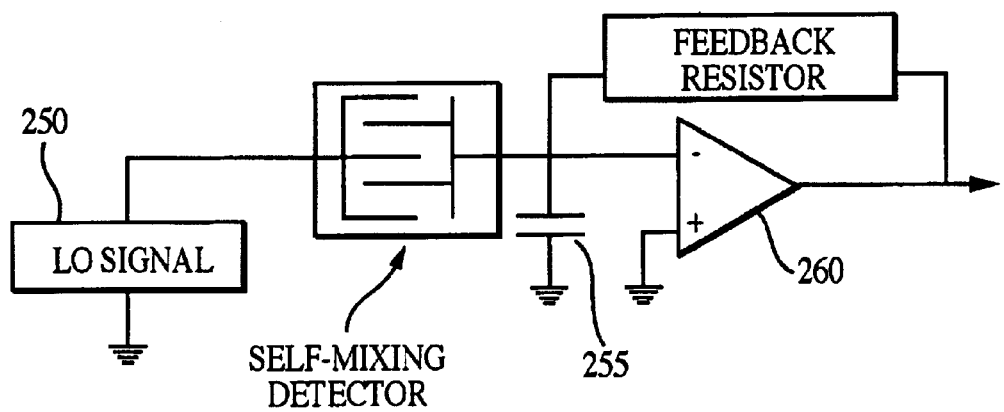
FIG. 8 is a detector/receiver circuit diagram for the ladar architecture of FIGS. 3 and 4.

A preferred circuit for recovering a mixed photo-current is shown in FIG. 8. Here the local oscillator (LO) voltage 250 is applied to one set of fingers, while the other set of fingers is AC grounded through a capacitor 255. The mixed photo-current is fed into a transimpedance amplifier 260 which converts the current into a voltage.

The detector is modeled as identical back-to-back Schottky barrier diodes and, thus will have equal impedances for positive and negative LO voltages. Balanced impedances for both LO polarities causes any current induced by a zero-mean LO to average to zero at the output of the transimpedance amplifier. This is especially desirable from a ladar systems standpoint because currents induced by impedance unbalance appear as false targets at the output of the ladar's signal processor. The most important benefit, is that with a zero mean LO voltage applied, the detector has no average response to background light because the photo-current current flows equally positively and negatively for each half cycle of the LO voltage. For these reasons care is taken in the design and processing of the detectors to achieve balanced operation.

There are other attributes that make self-mixing detectors desirable for FM/cw ladar systems. One attribute is that the LO driving impedance is only 0.4 picofarads for a 250 μm square device which is easily driven by conventional low power microwave amplifiers. For array applications, the detectors can be made considerably smaller which drives down the capacitive load per device, thus small arrays and portions of large arrays can be driven with the LO without much difficulty. Additionally, these detectors require only 1.0 $V_{p-p}$ of LO voltage for maximum intermediate frequency (IF) signal; this also reduces the complexity and cost of the driving microwave amplifier. At these local oscillator (LO) levels, the detectors have measured IF signal bandwidths in excess of 500 kHz and responsivities of 0.01 to 0.125 A/W; the rf bandwith is in excess of 1300 MHz. Over a full chirp (100–700 MHz), the MSM detectors had a reasonably flat IF voltage response with no obvious distortion in the IF signal. Additionally, impedance balance of the detectors was sufficient to cause little induced signal from self-detection of the LO signal.

In general, the MSM detector of FIG. 6 is a photo-detector 310 formed by laying two conductive, inter-digitated electrodes 315 and 320 on the surface of an undoped semiconductor substrate 325. Charge carriers created by light incident on the exposed semiconductor are collected with the electrodes. FIG. 6 shows a plurality of inter-digitated electrodes or fingers where the finger width (d1) and finger spacing (d2) of the electrodes largely determine the device characteristics, such as responsivity, bandwidth, and inter-electrode capacitance. Because of the low inter-electrode capacitance, MSM detectors are capable of detecting multi-GHz amplitude-modulated optical signals. A characteristic of particular importance for ladar applications is a voltage-variable responsivity that can be modulated at microwave frequencies to mix or downconvert light signals that are amplitude modulated at microwave frequencies.

Figure 9:
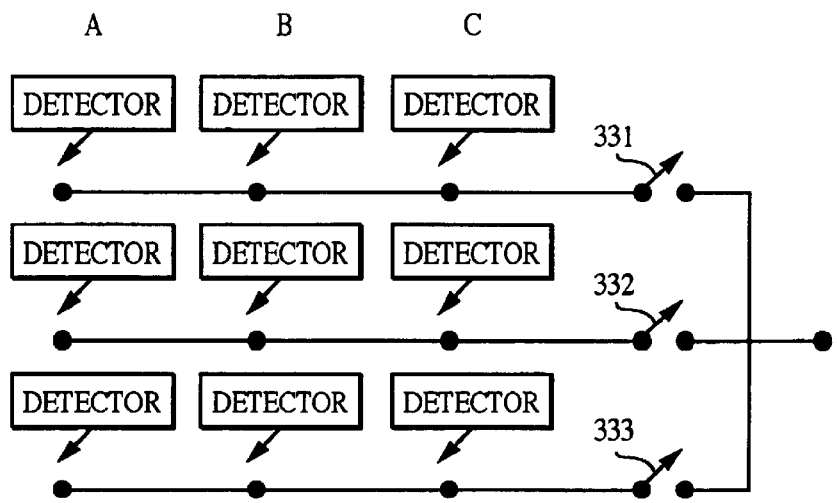
FIG. 9 is a diagram of a time-multiplexed read-out arrangement for focal plane arrays.

A simplified diagram of a time-multiplexed arrangement for focal plane arrays is shown in FIG. 9. Here voltages representing current or charge proportional to the amount of light power or energy impinging on a detector pixel are fed into high-speed electronic switches 331, 332, and 333. To read-out these voltages, the switch 331 for the first row is closed and the switches for columns A, B, and C are sequentially closed and opened while an analog-to-digital converter samples the voltages at the appropriate times. This same process is repeated for the second and third rows to create a complete image. The digitized data is then displayed or stored. For ordinary 30 Hz video frame-rates this technique is adequate; however, for very high frame rates of, for example 1000 to 10,000 Hz, this technique may become difficult and expensive to implement.

In using ladar systems, frame-rates beyond 10,000 Hz may be encountered. As an example, a ladar designed with 0.25 m range resolution, 100 m range, and 30 Hz frame-rate will generate IF signals up to 12 kHz. To sample the IF signal at the Nyquist rate requires a read-out circuit with a frame-rate at 24 kHz. Additional bandwidth as high as (300–500 kHz) is desirable for certain applications because shifting of the ladar's range swath can be achieved in software, thereby eliminating some microwave hardware.

Figure 11:
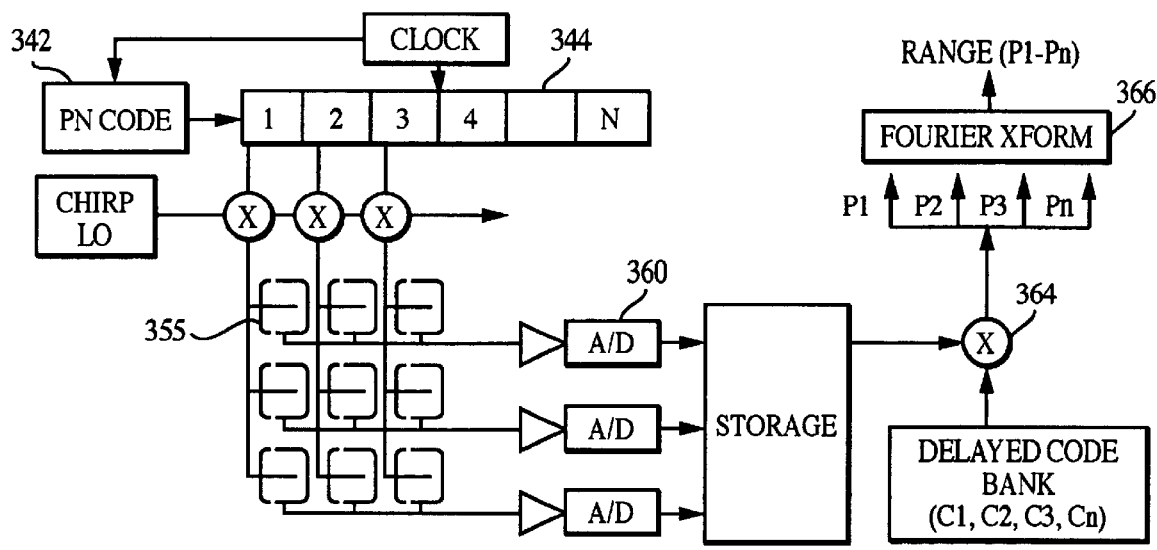
FIG. 11 is a diagram of a code-multiplexed read-out arrangement for focal plane arrays.
Figure 10:
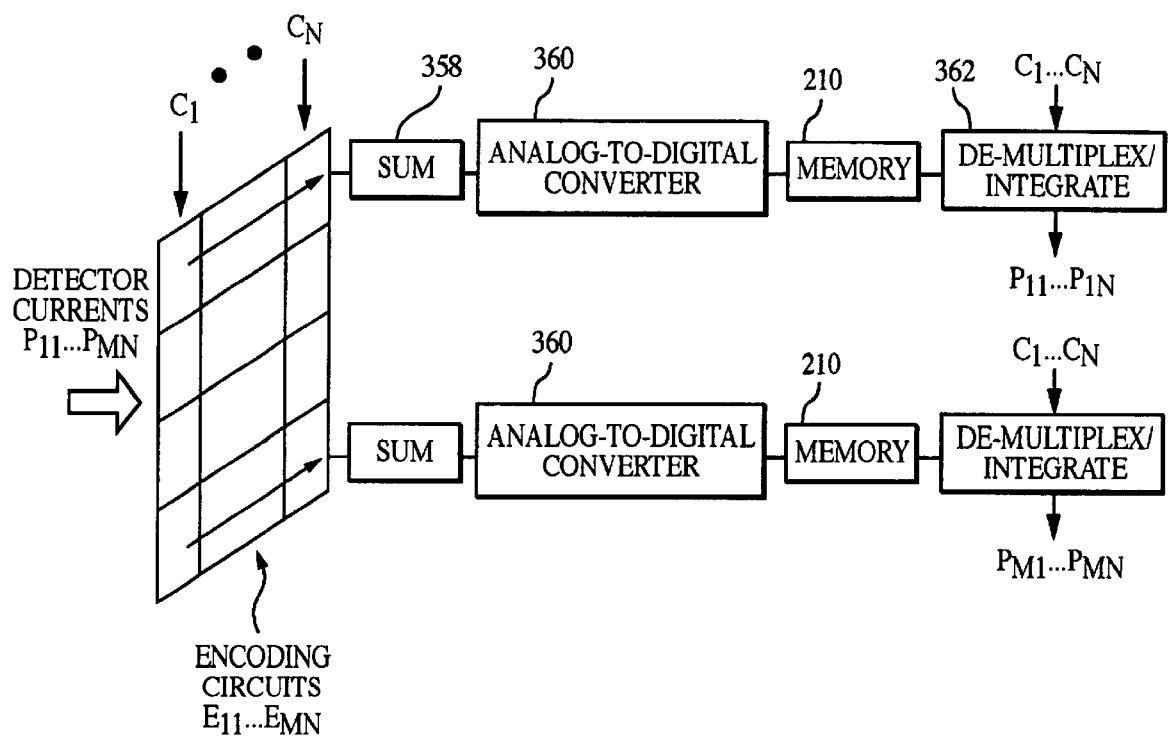
FIG. 10 illustrates a code-multiplexed read-out process for focal plane arrays.

FIG. 10 shows the general processing steps of a code multiplexed focal plane array (FPA) read-out device such as would be applied to the ladar arrangements of FIGS. 1 through 4. The currents from the focal plane array detecting elements, $P_{11}$ through $P_{mn}$ are fed into respective encoding circuits $E_{11}$ through $E_{mn}$ that impress a unique pseudo-random code on the detector output currents in every column of the focal plane array. The encoded current outputs of all the detectors from every row of the encoding circuits are linearly summed 358 and fed to respective analog-to-digital converters 360 at the summed output of each row. The A/D's in-turn sample the row outputs periodically over the entire chirp period and send the data to a memory 210. The data in each row in memory is then fed into a de-multiplexer stage 362 where it is processed against the unique code associated with each pixel in a given row to recover (or de-multiplex) the respective photo-currents from pixels $P_{11}$ through $P_{1n}$ as in the top row. This process is repeated for all rows to recover all pixel currents $P_{11}$ through $P_{mn}$. As shown in FIG. 11, the de-multiplexing process involves a multiplication 364 of the signal in memory by the respective code followed by an integration 366. The discrete Fourier transform that is applied to the de-multiplexed pixel photo-currents over the chirp period to generate the 3-D image file serves as an integrator.

A detailed block diagram of a specific embodiment of a code multiplexed read-out utilizing a self-mixingdetector/focal plane array in a FM/cw ladar is shown in FIG. 11. Here the output of a pseudo-random (PN) code generator 342 is fed into the input of an n stage shift register 344 that is driven by the PN code clock 346. Outputs from successive stages of the shift register delay the PN code by a corresponding number of clock periods. These delayed versions of the PN code are generally orthogonal or unique and are used to bi-phase modulate the ladar's local oscillator chirp signal using microwave mixers. The outputs from the mixers are then used as the local oscillators for all of the MSM detectors in the respective columns of the focal plane array. The net effect is to impress a unique (orthogonal) code on the intermediate frequency (IF) data recovered for each pixel in a row of the focal plane array. This overall process performs the encoding process of the general read-out. Outputs from all of the detectors in an array row are then summed in a transimpedance amplifier 346. The amplifier outputs are sampled over the chirp period by analog-to-digital converters (A/D) 360 and the resulting data is stored 210. A computer processor is normally used to de-multiplex the data. Here the data from each A/D 360 or row is successively multiplied 364 by the delayed code to recover the IF signal from the respective pixels. As a final step, the Fourier transform 366 is applied to the signal from each pixel to determine the range to the targets in each pixel and perform an integration that is necessary to reduce noise components from other pixel signals in the row.

The multiplexed read-out concept can use other orthogonal bases, such as sine waves at different frequencies, to achieve encoding. Of course matching basis functions in the de-multiplexing stage will have to be used. The read-out circuit can be placed behind the detector elements in the focal plane array and the detector output can be fed into an amplifier and then multiplied with an encoding basis function in a mixer or analog multiplier. The output of all the mixers in a row could then be summed to achieve the identical multiplexing process. De-multiplexing can be achieved in off-board circuitry or in software. This is especially advantageous because the bandwidth of the amplifier need only pass the maximum frequency expected from the output of the detector and not the entire PN code bandwidth.

Figure 12:
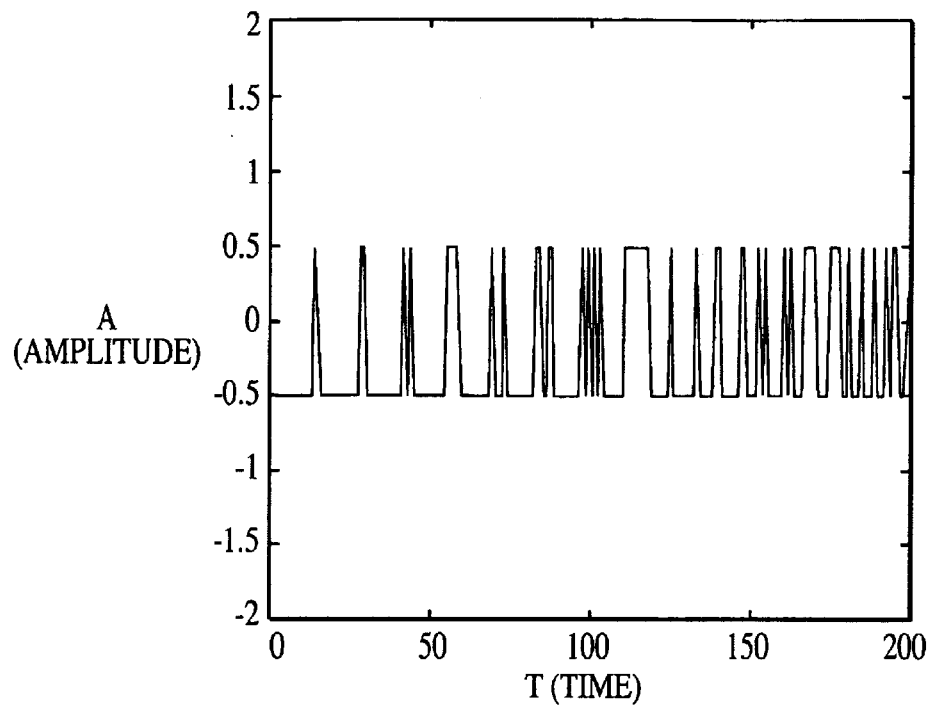
FIG. 12 is a partial plot of a pseudo-random(PN) code versus time.
Figure 13:
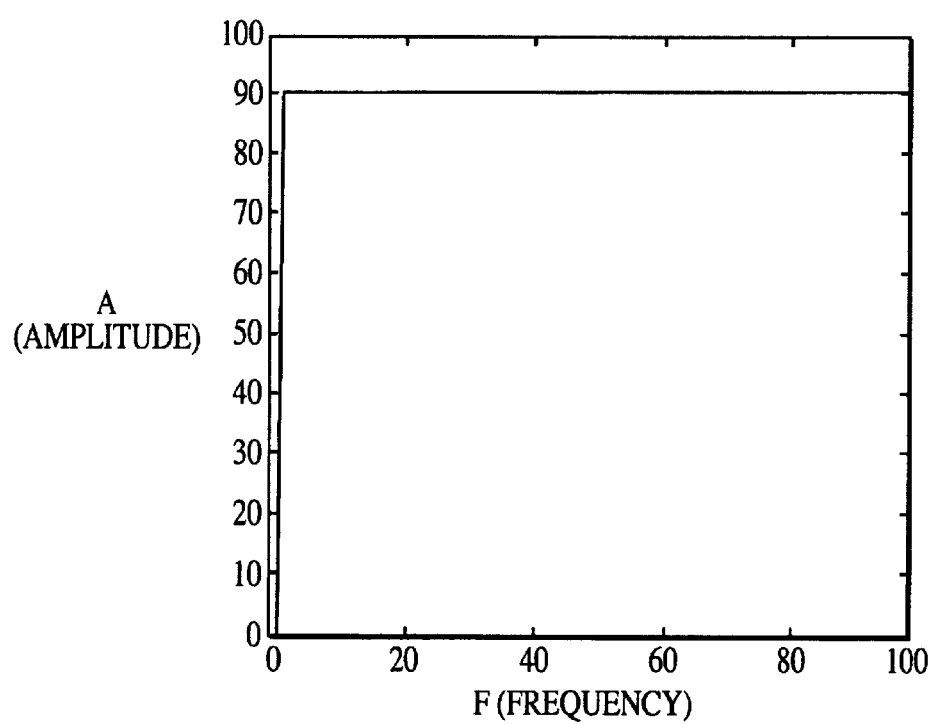
FIG. 13 is a Fourier transform of a pseudo-random (PN) code.
Figure 14:
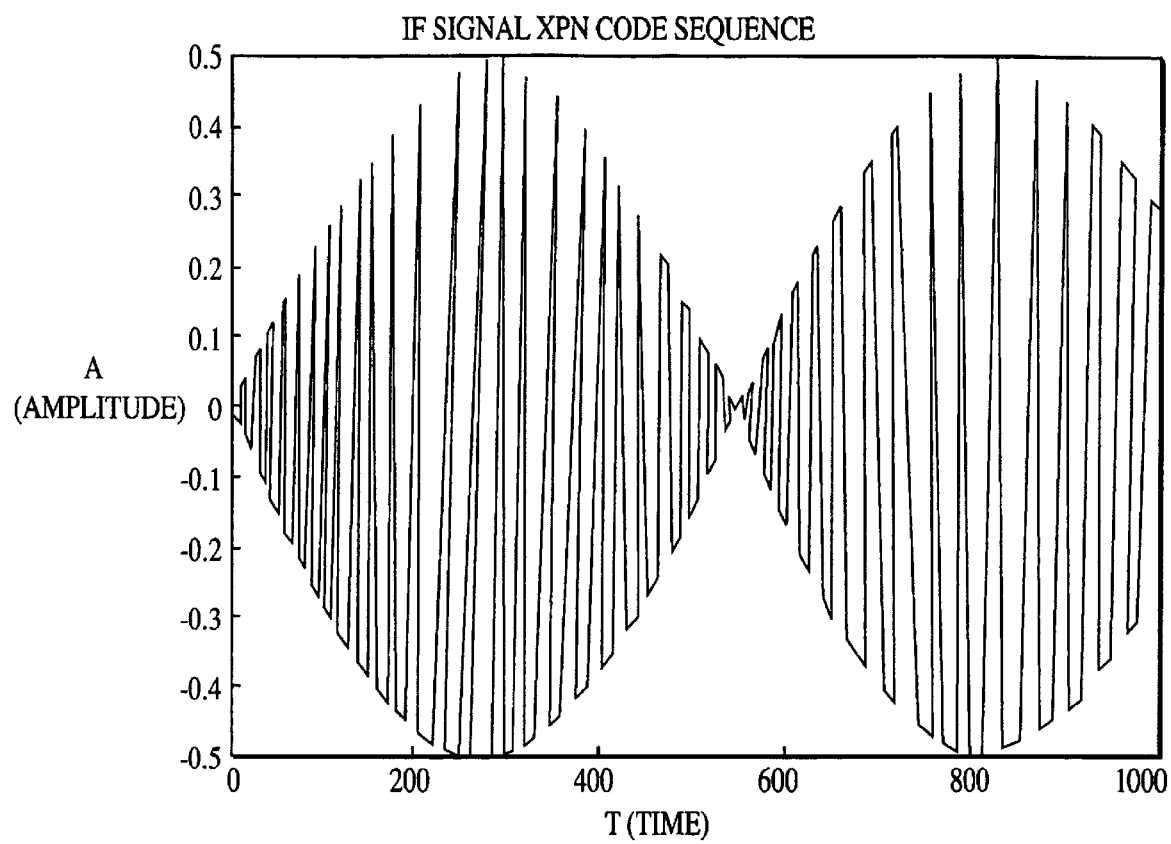
FIG. 14 is an IF signal modulated by a pseudo-random (PN) code.
Figure 15:
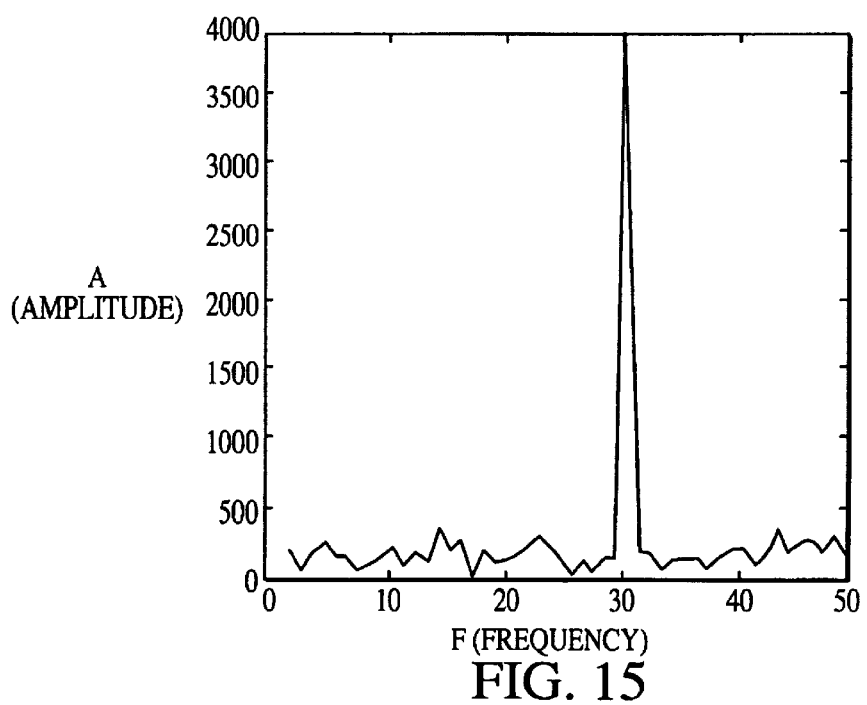
FIG. 15 is Fourier transform of the output from one pixel of a focal plane array

Results of a computer simulation of the different processing steps for a code multiplexed read-out are shown on FIGS. 12 through 15. The read-out was simulated for an arrangement of 32 pixels in a row, equal amplitude signals in every pixel, and a 32,767 chip code. A partial plot of the PN code (to 200 clock cycles) is shown in FIG. 12 where the levels have been shifted to toggle between +/−0.5. As discussed, delayed versions of this code are used to bi-phase modulate the LO for the MSM detectors in a focal plane array FPA column. In FIG. 12, the horizontal scale represents time (T) or clock cycles and the vertical scale represents amplitude(A). The Fourier transform of the PN code sequence is shown in FIG. 13 where the PN code power is generally distributed evenly over all frequencies. In FIG. 13 the horizontal scale represents frequency (F) and the vertical scale represents amplitude (A). The light signal returning from the target is mixed with the LO in the MSM detectors. This recovers an IF signal, as shown in FIG. 14, which is also bi-phase modulated. In FIG. 14, the horizontal scale represents time (T) or clock cycles and the vertical scale represents amplitude (A). The effect is to convert the IF signal into a noise-like signal with a bandwidth roughly equal to the clock frequency. The noise-like IF signals from all of the pixels in a row are incoherently summed in the transimpedance amplifier. This summed IF signal is then fed into an A/D and stored. To de-multiplex the individual pixel IF signals, the summed IF is multiplied with the delayed code associated with the selected pixel. This new IF signal is then Fourier transformed to map the IF signal into range and filter-out the noise contributions from the IF signals present from the other pixels, as shown in FIG. 15. In FIG. 15, the horizontal scale represents frequency (F) and the horizontal scale represents amplitude (A). As expected noise components are present in other range bins; the noise level is controlled by the PN code length.

The noise power density $P_{dn}$ for the signal power in a single pixel after multiplying by the code can be expressed as $$P_{dn} = \frac{P_s}{f_{clk}},$$

where $P_s$ is the total signal power over the entire frequency band and $f_{clk}$ is the clock frequency. The noise power, $P_n$ for a single range-gate with bandwidth $B_w$, is $$P_n = \frac{P_s \cdot B_w}{f_{clk}}.$$

If we set $B_w$ equal to $1/T_s$ (which is the bandwidth when the FFT is performed to form range-gates), where $T_s$ is the total running time of the code, and $$f_{clk} = \frac{M}{T_s}$$

where M is the number of clock periods in the PN code, we can write $$P_n = \frac{P_s \cdot \frac{1}{T_s}}{M/T_s}, \text{ or}$$

$$P_n = \frac{P_s}{M}$$

for a single illuminated pixel. For $N_p$ illuminated pixels, we can write $$P_n = \frac{P_s}{M} \cdot N_p$$

We process out the signal in any pixel by multiplying the total IF signal in a row by the corresponding code and performing the FFT; this recovers a signal with power $P_s$. The signal-to-noise ratio S/N in any range-gate is $$\frac{S}{N} = \frac{P_s}{P_n} = \frac{P_s}{P_s \cdot N_p/M} = \frac{M}{N_p}.$$

To determine the required clock frequency $f_{clk}$ in terms of a desired signal-to-noise ratio, we substitute for M, $$\frac{P_s}{P_n} = \frac{f_{clk} \cdot T_s}{N_p},$$

which yields $$f_{clk} = \left(\frac{P_s}{P_n}\right) N_p \cdot B_w.$$

It should be understood that the foregoing description is only illustrative of the invention and that various alternatives and modifications can be made by those skilled in the art without departing from the principles and concepts of the invention. Accordingly, the present invention is intended to encompass all such alternatives, modifications, and variations which fall within the appended claims.

References

1. B. L. Stann et al., "Line imaging ladar using a laser-diode transmitter and FM/cw radar principles for submunition applications", SPIE AeroSense
2. W. C. Ruff et al., "Self-mixing detector candidates for an FM/cw ladar architecture", SPIE AeroSense
3. P. Shen et al., "Interdigitated finger semiconductor photodetector for optoelectronic mixing", SPIE AeroSense

What is claimed is:

1. A ladar system for detecting a target, comprising:
    a signal generator for generating a waveform signal having a predetermined period;
    a laser for producing a light signal, the laser having a modulator that is connected to the signal generator for receiving the waveform signal and the laser producing a modulated laser light signal directed toward a target;
    mixing and detecting means coupled to and driven by the signal generator for converting reflected light signals received from the target to electrical signals and for mixing the converted electrical signals with the waveform signal to produce an output electrical signal containing signal information relating to the distance to the target;
    read-out means connected to the mixing and detecting means for removing the output electrical signals from the mixing and detecting means; and
    a signal processor connected to the read-out means for processing the output electrical signals from the read-out means, wherein the mixing and detecting means comprises a plurality of detecting elements and, wherein each detecting element detects and converts reflected light signals received from the target to electrical signals and the plurality of detecting elements are arranged in a two dimensional array of rows and columns, wherein the read-out means comprises a code generating means for generating a different code signal for each of the detecting elements of the array during the waveform period and for combining the different code signal for a given detecting element with the output electrical signal produced by the detecting element during the waveform period to produce a combined output signal for each detecting element, wherein the read-out means further comprises a summing means for summing the combined output signal for each detecting element in a row of the array to produce a summed row output signal, wherein
    the read-out means further comprises a de-multiplex means for separating the output electrical signal for a detecting element in a row of the array from the summed row output signal by multiplying the code signal for the detecting element by the summed row output signal to generate a product that contains the output electrical signal of the detecting element, and wherein the de-multiplex means further comprises an integrator means for recovering the output electrical signal.

2. A device for processing light signals received from an object comprising:
    a focal plane array comprising a plurality of detecting elements, wherein each detecting element detects and converts a reflected light signal received from the object to an electrical signal and the plurality of detecting elements are arranged in an array; and
    a read-out circuit connected to the focal plane array for extracting the converted electrical signals from each of the plurality of detecting elements in the array and for combining the extracted signals to form an image of the object, wherein the read-out circuit comprises a code generating means for generating a different code signal for each of the detecting elements and for combining the different code signal for a given detecting element in a group of the array with the output electrical signal produced by the given detecting element to produce a combined output signal for each detecting element in the array, wherein the read-out circuit further comprises a summing means for summing the combined output signals in a group of the array to produce a summed group output signal, for each detecting element in a row of the array to produce a summed row output signal, wherein the read-out means further comprises a de-multiplex means for separating the output electrical signal for a detecting element in a group of the array from the summed group output signal by multiplying the code signal for the detecting element by the summed group output signal to generate a product that contains the output electrical signal of the detecting element, and wherein the de-multiplex means further comprises an integrator means for recovering the output electrical signal to form an image of the object.

3. A method of detecting a target by an array of detecting elements, comprising the steps of:
    generating a waveform signal having a predetermined waveform period;
    producing a laser light signal, that is modulated by the waveform signal and directed toward a target;
    converting reflected light signals received from the target by the detecting elements into electrical signals and mixing the converted electrical signals with the waveform signal to produce an output electrical signal containing target signal information;
    generating a different code signal for each detecting element in a pre-selected group of the detecting elements in the array during the waveform period and combining the different code signal for each detecting element in the group with the output electrical signal produced by the detecting element to produce a combined output signal for each detecting element in the group;
    summing the combined output signal for each detecting element in a group of the detecting elements to produce a summed group output signal;
    separating the output signal for a detecting element in the group by multiplying the code signal for the detecting element by the summed group output signal to generate a signal product that contains the output electrical signal of the detecting element; and integrating the signal products to recover the output electrical signal and to detect the target.

4. A method for processing light signals received from an object by a plurality of detecting elements in a focal plane array to form an object image, comprising the steps of:

detecting and converting reflected light signals received from the object by each detecting element into an electrical signals;

generating a different code signal for each detecting element of the array and combining the different code signals with the output electrical signals produced by the detecting elements to produce a combined output signal for each detecting element;

summing the combined output signal for the detecting elements to produce a summed output signal;

separating the output electrical signal for a detecting element by multiplying the code signal for the detecting element by the summed output signal to generate a product signal that contains the output electrical signal; and integrating the product signals for the detecting elements to recover the output electrical signal and to form an image of the object.

5. A ladar system for detecting a target, comprising:

a signal generator for generating a waveform signal having a predetermined period;

a laser having a modulator that is connected to the signal generator for receiving the waveform signal and for producing a modulated laser light signal directed toward a target;

mixing and detecting means coupled to and driven by the signal generator for converting reflected light signals received from the target to electrical signals and for mixing the converted electrical signals with the waveform signal to produce an output electrical signal containing signal information relating to the range to the target;

read-out means connected to the mixing and detecting means for receiving the output electrical signals from the mixing and detecting means; and a signal processor connected to the read-out means for processing the output electrical signals from the read-out means for determining the range to the target;

wherein the mixing and detecting means comprises a plurality of detecting elements;

wherein each detecting element detects and converts reflected light signals received from the target to electrical signals and the plurality of detecting elements are arranged in a two dimensional array of rows and columns; and wherein the read-out means comprises a code generating means for generating a different code signal for each of the detecting elements of the array during the waveform period and for combining the different code signal for a detecting element with the output electrical signal produced by the detecting element during the waveform period to produce a combined output signal for each detecting element.

6. The ladar system of claim 5, wherein the read-out means further comprises a summing means for summing the combined output signal for each detecting element in a row of the array to produce a summed row output signal.

7. The ladar system of claim 6, wherein the read-out means further comprises a de-multiplex means for separating the output electrical signal for a detecting element in a row of the array from the summed row output signal by multiplying the code signal for the detecting element by the summed row output signal to generate a product that contains the output electrical signal of the detecting element.

8. The ladar system of claim 7, wherein the de-multiplex means further comprises an integrator means for recovering the output electrical signal.

9. A ladar system for detecting a target, comprising:

a signal generator for generating a waveform signal having a predetermined period;

a laser having a modulator that is connected to the signal generator for producing a modulated laser light signal directed toward a target;

mixing and detecting means comprising a plurality of detecting elements coupled to and driven by the signal generator for converting reflected light signals received from the target to electrical signals and for mixing the converted electrical signals with the waveform signal to produce an output electrical signal containing information relating to the range to the target;

read-out means connected to the mixing and detecting means for processing the output electrical signals from the detecting elements comprising a code generating means for generating a different code signal for each of the detecting elements during the waveform period and for combining the different code signal for a given detecting element with the output electrical signal produced by the given detecting element during the waveform period to produce a combined output signal for each of the detecting elements; and a signal processor connected to the read-out means for processing the output electrical signals from the read-out means for determining the range to the target.

10. The ladar system of claim 9, wherein the read-out means further comprises a summing means for summing the combined output signal for each detecting element in a pre-selected group of detecting elements to produce a summed group output signal.

11. The ladar system of claim 10, wherein the read-out means further comprises a de-multiplex means for separating the output electrical signal for a detecting element in the preselected group of detecting elements from the summed group output signal by multiplying the code signal for the detecting element by the summed group output signal to generate a product that contains the output electrical signal of the detecting element.

12. The ladar system of claim 11, wherein the de-multiplex means further comprises an integrator means for recovering the output electrical signal.

13. A device for processing light signals received from an object comprising:

a focal plane array comprising a plurality of detecting elements, wherein each detecting element detects and converts a reflected light signal received from the object to an electrical signal and the plurality of detecting elements are arranged in a two dimensional array of rows and columns; and a read-out circuit connected to the focal plane array for extracting the converted electrical signals from each of the plurality of detecting elements in the array and for combining the extracted signals to form an image of the object, wherein the readout circuit comprises a code generating means for generating a different code signal for each column of detecting elements in the array and for combining the different code signals for the detecting elements in the column with the output electrical signals produced by the detecting elements in the columns to produce a combined output signal for each detecting element in the column.

14. The device of claim 13, wherein the read-out circuit further comprises a summing means for summing the combined output signal for each detecting element in a row of the array to produce a summed row output signal.

15. The device of claim 14, wherein the read-out circuit further comprises a de-multiplex means for separating the output electrical signal for a detecting element in a row of the array from the summed row output signal by multiplying the code signal for the detecting element by the summed row output signal to generate a product that is the output electrical signal for the detecting element.

16. The device of claim 15, wherein de-multiplex means further comprises an integrator means for recovering the output electrical signal.

17. The device of claim 16, further comprising a signal processor connected to the read-out circuit for processing the output electrical signals from the read-out circuit to form an image of the object.

18. A device for processing light signals received from an object comprising:
 a focal plane array comprising a plurality of detecting elements, wherein each detecting element detects and converts a reflected light signal received from the object to an electrical signal and the plurality of detecting elements are arranged in a two dimensional array of rows and columns; and
 a read-out circuit connected to the focal plane array for extracting the converted electrical signals from each of the plurality of detecting elements in the array and for combining the extracted signals to form an image of the object, wherein the readout circuit comprises a code generating means for generating a different code signal for each row of detecting elements in the array and for combining the different code signals for the detecting elements in the row with the output electrical signals produced by the detecting elements in the rows to produce a combined output signal for each detecting element in the row.

19. The device of claim 18, wherein the read-out circuit further comprises a summing means for summing the combined output signal for each detecting element in a column of the array to produce a summed column output signal.

20. The device of claim 19, wherein the read-out circuit further comprises a de-multiplex means for separating the output electrical signal for a detecting element in a column of the array from the summed column output signal by multiplying the code signal for the detecting element by the summed column output signal to generate a product that is the output electrical signal for the detecting element.

21. The device of claim 20, wherein de-multiplex means further comprises an integrator means for recovering the output electrical signal.

22. The device of claim 21, further comprising a signal processor connected to the read-out circuit for processing the output electrical signals from the read-out circuit to form an image of the object.

* * * * *